United States Patent [19]

Nakamura

[11] Patent Number: 5,068,151

[45] Date of Patent: Nov. 26, 1991

[54] GOLF BALL

[75] Inventor: Yoshinobu Nakamura, Nishinomiya City, Japan

[73] Assignee: Sumitomo Rubber Industries, Ltd., Hyogo, Japan

[21] Appl. No.: 474,330

[22] Filed: Feb. 2, 1990

[30] Foreign Application Priority Data

Feb. 6, 1989 [JP] Japan ................... 1-26866

[51] Int. Cl.$^5$ ............ B32B 27/28; A63B 37/12; C08L 33/02; C08F 220/06
[52] U.S. Cl. ............ 428/407; 525/330.2; 525/196; 525/221; 273/235 R
[58] Field of Search ............ 525/196, 330.2; 273/235 R; 428/407

[56] References Cited

U.S. PATENT DOCUMENTS

| | | | |
|---|---|---|---|
| 3,264,272 | 8/1966 | Rees | 525/339 |
| 3,819,768 | 6/1974 | Molitor | 273/235 R |
| 4,911,451 | 3/1990 | Sullivan et al. | 525/196 |

FOREIGN PATENT DOCUMENTS 61-081768  4/1986  Japan .

OTHER PUBLICATIONS

Research Disclosure–Kenneth Mason Publications #27221–"Golf Balls Based on Li Ionomers . . . " 12/1986.

*Primary Examiner*—Carman J. Seccuro
*Attorney, Agent, or Firm*—Birch, Stewart, Kolasch & Birch

[57] ABSTRACT

Disclosed is a golf ball having improved impact resilience, which comprises a core and a cover covering the core, wherein the cover is a lithium neutralized ionomer resin which is a copolymer of 10 to 20% by weight of an alpha, beta-unsaturated carboxylic acid and the rest of ethylene, of which 20 to 70 mol % of carboxyl groups are neutralized with lithium ion, and the ionomer resin has a melt index of 0.5 to 5.0 and a shore D hardness of at least 60. The lithium neutralized ionomer resin may be combined with a di- or tri- valent metal neutralized ionomer resin which is a copolymer of 10 to 20% by weight of an alpha, beta-unsaturated carboxylic acid and the rest of ethylene, of which 40 to 70 mol % of carboxyl groups are neutralized with di- or tri- valent metal ion, and which has a melt index of 0.5 to 5.0 and a shore D hardness of 60 to 80.

9 Claims, No Drawings

GOLF BALL

FIELD OF THE INVENTION

The present invention relates to a golf ball which is covered by a specific cover material.

BACKGROUND OF THE INVENTION

A cover material of golf balls is an ionomer resin which is excellent in impact resistance, cut resistance and impact resilience. Two sorts of the ionomer resins, i.e. sodium neutralized ionomer resin and zinc neutralized ionomer resin, are commercially available under the trade names of "SURLYN", "HI-MILAN" and the like, and no other ionomer resins are available.

The sodium neutralized ionomer resin has superior impact, resilience in comparison with the zinc neutralized one. In order to improve impact resilience of golf balls, U.S. Pat. No. 3,819,768 proposes that the sodium neutralized ionomer resin and zinc neutralized ionomer resin are mixed. However, since ionomer resin available are only two sorts, as mentioned above, the modification by the mixing method are lacking in variety.

Japanese Kokai Publication (unexamined) 82768/1986 also proposes that the sodium neutralized ionomer resin, or a mixture of the sodium neutralized ionomer resin and the zinc neutralized ionomer resin, is additionally neutralized with other metal, such as lithium, potassium, cesium and rubidium to improve impact resilience. The ionomer resin is poor in reactivity in the additional neutralization. Accordingly, the ionomer resin used in the additional neutralization and an amount of it are so limited that it is difficult to obtain a high neutralizing degree.

SUMMARY OF THE INVENTION

It has been surprisingly found that an ionomer resin which is neutralized with lithium ion has higher impact resilience than the commercially available sodium or zinc neutralized ionomer resin. Thus, the present invention provides a golf ball which comprises a core and a cover covering the core, wherein the cover is a lithium neutralized ionomer resin which is a copolymer of 10 to 20% by weight of an alpha, beta-unsaturated carboxylic acid and the rest of ethylene, of which 20 to 70 mol % of carboxyl groups are neutralized with lithium ion, and the ionomer resin has a melt index of 0.5 to 5.0 and a shore D hardness of 60 to 80.

The present invention also provides a golf ball which comprises a core and a cover covering the core, wherein the cover is a mixture of the above mentioned lithium neutralized ionomer resin with 10 to 90% by weight of a di- or tri- valent metal neutralized ionomer resin which is a copolymer of 10 to 20% by weight of an alpha, beta-unsaturated carboxylic acid and the rest of ethylene, of which 40 to 70 mol % of carboxyl groups are neutralized with divalent metal ion, and the di- or tri- valent metal neutralized ionomer resin has a melt index of 0.5 to 5.0 and a shore D hardness of 60 to 80.

DETAILED DESCRIPTION OF THE INVENTION

The lithium neutralized ionomer resin of the present invention is prepared by neutralizing with lithium ion an ionomer base polymer. The ionomer base polymer is a copolymer of 10 to 20% by weight of an alpha, beta-unsaturated carboxylic acid (e.g. acrylic acid, methacrylic acid etc.) and the rest of ethylene. If the alpha, beta-unsaturated carboxylic acid is less then 10% by weight, stiffness is poor. If it is more than 20% by weight, the obtained resin is brittle. The ionomer base polymer may be obtained by copolymerizing the alpha, beta-unsaturated carboxylic acid and ethylene. The copolymerization can be conducted by well known methods. The ionomer base polymer may also be prepared by treating the commercially available sodium neutralized ionomer resin in a nitric acid aqueous solution followed by rinsing with water to remove sodium ion. Treating conditions for removing sodium ion per se are known in the art.

The neutralization may be carried out by mixing and melting the ionomer base polymer and a lithium ion source. Examples of the lithium ion sources are lithium hydroxide, lithium carbonate, lithium methoxide, lithium acetate and the like. A degree of neutralization is preferably 20 to 70 mol %, more preferably 20 to 50 mol % of the free carboxyl group in the ionomer base polymer. If it is less than 20 mol %, the obtained resin is poor in stiffness and impact resilience. If it is more than 70%, stiffness is too high and feeling when one hit a golf ball is poor. The obtained resin also has poor moldability and is poor in impact resistance.

The lithium neutralized ionomer resin of the present invention has a melt index of 0.5 to 5.0, preferably 0.8 to 3.0. The melt index is determined according to JIK-K 6760 (190° C. and 2,160 g load). Melt indexes of less than 0.5 deteriorate flowability, moldability and impact resistance. Melt indexes of more than 5.0 deteriorate impact resilience and impact resistance. The ionomer resin also has a shore D hardness of 60 to 80, preferably 60 to 70. If it is less than 60, impact resilience is poor. If it is more than 80, the ball is too hard.

Since the lithium neutralized ionomer resin has highly improved impact resilience in comparison with the commercially available sodium or zinc neutralized ionomer resin, it is suitable for a cover of the golf ball of the present invention. As the cover resin, the lithium neutralized ionomer resin is used solely or in combination with other ionomer resin. The other ionomer resin to be combined with the lithium neutralized ionomer resin may be any ionomer resins known in the art, but preferably be a di- or tri- valent metal neutralized ionomer resin which is a resin that 40 to 70 mol %, preferably 40 to 60 mol %, of carboxyl groups of the above mentioned ionomer base polymer are neutralized with divalent metal ion.

The di- or tri- valent metal neutralized ionomer resin can be commercially available zinc neutralized ionomer resins or those prepared by neutralizing the ionomer base polymer with di- or tri- valent metal ion, preferably divalent metal ion (e.g. magnesium ion, calcium ion, aluminum ion, barium ion, copper ion etc.). Neutralization of the ionomer base polymer may be carried out by melting and mixing the base polymer with a di- or tri- valent metal ion source. Examples of the di- or tri- valent metal ion sources are carbonates, acetates, hydroxides and oxides of the di- or tri- valent metal. If the degree of neutralization is less than 40 mol %, stiffness and impact resilience are poor. If it is more than 70 mol %, the resin is very hard and feeling when one hit the ball is poor. Moldability and impact resistance are also poor.

The di- or tri- valent metal neutralized ionomer resin of the present invention has a melt index of 0.5 to 5.0, preferably 0.7 to 2.0. Melt indexes of less than 0.5 deteriorate flowability, moldability and impact resistance. Melt indexes of more than 5.0 deteriorate impact resilience and impact resistance. The ionomer resin also has a shore D hardness of 60 to 80, preferably 60 to 70. If it is less than 60, impact resilience is poor.

In case where the cover is prepared from a mixture of the lithium neutralized ionomer resin and the di- or trivalent metal neutralized ionomer resin, impact resilience are highly enhanced. A mixing ratio of lithium neutralized ionomer resin / di- or tri- valent metal neutralized resilience is 10 / 90 to 90 / 10, preferably 70 / 30 to 40 / 60. The ionomer resin mixture of the present invention also required to have a melt index of 0.5 to 3.0, preferably 1.0 to 2.5. If the melt index is less than 0.5, its flowability is too low and it is difficult to mold. Impact resistance is also deteriorated. If it is more than 3.0, both impact resilience and impact resistance are deteriorated. The ionomer resin mixture has a Shore D hardness of 60 to 80, preferably 60 to 70. The hardness of less than 60 deteriorates impact resilience. Mixing of the ionomer resins may be carried out using an extruder, such as a single screw extruder or a twin screw extruder which is preferred.

The cover resin may further contain additives, if necessary. Examples of the additives are a pigment, a lubricant, a dispersant (calcium stearate etc.), an antioxidant, a stabilizer, a UV absorber, an antistat and the like.

The golf ball of the present invention can be prepared by covering a golf ball core with the cover material. The covering method can be any methods used in this field, generally an injection molding. The golf ball core can be either a solid core which is solidly molded from rubber, or a thread-wound core which is prepare by winding rubber thread on a center material.

The golf ball of the present invention has much improved impact resilience.

EXAMPLES

The present invention is illustrated with the following examples which, however, are not to be construed as limiting the present invention to their details.

EXAMPLES 1 TO 5 AND COMPARATIVE EXAMPLES 1 TO 6

A rubber composition was prepared by mixing 100 parts by weight of polybutadiene, 35 parts by weight of zinc acrylate, 16 parts by weight of zinc oxide and 1 part by weight of dicumyl peroxide. The composition was vulcanized at 150° C. for 30 minutes to form a solid core having an average diameter of 38.4 mm.

Preparation of Cover Resins

Three ionomer resins (1), (2) and (3) were prepared by mixing the ingredients shown in Table 1 in a twin screw extruder. The resin was extruded to pellels at a temperature of 200 to 260 ° C. Extruding conditions were a screw diameter of 45 mm, a screw rotating rate of 200 rpm and a screw L/D of 30. The cylinder temperature condition were as follow;

|  | Barrel |  |  |  |  |  |  |  |
|---|---|---|---|---|---|---|---|---|
|  | 1 | 2 | 3 | 4 | 5 | 6 | 7 | 8 |
| Temp. (°C.) | 100 | 150 | 180 | 200 | 240 | 270 | 270 | 270 |

Both an adapter and a die are set 270° C.

TABLE 1

|  | Resin (1) | Resin (2) | Resin (3) |
|---|---|---|---|
| HIMILAN 1605 treated with nitric acid* | 100 | 100 | 98 |
| Lithium carbonate | 1.7 | 1.1 | — |
| Magnesium hydroxide | — | — | 3 |

*Pellets of HIMILAN 1605 were ground to powder and added into a 3.5 N nitric acid solution. The solution was heated to reflux for 24 hours and then rinsed with water and dried under reduced pressure. In this treatment, metal ions were removed from the ionomer resin to reproduce ethylene-methacrylic acid copolymer.

Preparation of a Golf Ball

The core obtained above was covered with a cover resin shown in Table 2 by injection molding to form a golf ball. Mixing of the ionomer resins in Table 2 was conducted in the same conditions as the ionomer resins of Table 1.

TABLE 2

| Neutralizing ion | Resin name | Examples No. | | | | | |
|---|---|---|---|---|---|---|---|
|  |  | 1 | 2 | 3 | 4 | 5 | 6 |
| Lithium | Resin (1)[1] | 100 | — | 50 | 70 | 50 | 40 |
|  | Resin (2)[2] | — | 100 | — | — | — | — |
| Sodium | HIMILAN 1605[3] | — | — | — | — | — | — |
|  | HIMILAN 1707[4] | — | — | — | — | — | 20 |
| Divalent metal | HIMILAN 1706[5] | — | — | 50 | 30 | — | — |
|  | Resin (3)[6] | — | — | — | — | 50 | 40 |
| Melt index of cover resin |  | 1.4 | 3.0 | 1.8 | 1.9 | 1.2 | 1.4 |
| Hardness (Shore D) of cover resin |  | 68 | 66 | 72 | 71 | 70 | 72 |
| Ball weight (g) |  | 45.2 | 45.1 | 45.1 | 45.0 | 45.0 | 45.1 |
| Ball compression (PGA) |  | 100.5 | 99.2 | 100.3 | 99.8 | 99.0 | 1001 |
| Ball coefficient of restitution[7] |  | 0.7803 | 0.7790 | 0.7844 | 0.7856 | 0.7821 | 0.7816 |
| Ball durability[8] |  | 98 | 108 | 105 | 101 | 106 | 97 |

| Neutralizing ion | Resin name | Comparative Examples No. | | | | | |
|---|---|---|---|---|---|---|---|
|  |  | 1 | 2 | 3 | 4 | 5 | 6 |
| Lithium | Resin (1)[1] | — | — | — | — | — | — |
|  | Resin (2)[2] | — | — | — | — | — | — |
| Sodium | HIMILAN 1605[3] | 100 | — | 50 | 70 | — | 50 |
|  | HIMILAN 1707[4] | — | 100 | — | — | 50 | — |
| Divalent metal | HIMILAN 1706[5] | — | — | 50 | 30 | 50 | — |
|  | Resin (3)[6] | — | — | — | — | — | 50 |
| Melt index of cover resin |  | 2.8 | 0.9 | 1.7 | 2.2 | 0.8 | 1.8 |
| Hardness (Shore D) of cover resin |  | 67 | 67 | 70 | 69 | 69 | 70 |
| Ball weight (g) |  | 45.0 | 45.0 | 45.1 | 45.1 | 45.2 | 45.1 |
| Ball compression (PGA) |  | 99.4 | 100.3 | 100.4 | 100.0 | 100.5 | 98.0 |
| Ball coefficient of restitution[7] |  | 0.7711 | 0.7715 | 0.7759 | 0.7750 | 0.7748 | 0.7730 |

TABLE 2-continued

| Ball durability[8] | 100 | 90 | 90 | 97 | 95 | 109 |

[1] Ionomer resin (1); Methacrylic acid content is about 15%. The neutralizing ion is lithium and neutralizing amount is about 30 mol %. It has a melt index of 1.4.
[2] Ionomer resin (2); The neutralizing ion is lithium and neutralizing amount is about 20 mol %. It has a melt index of 3.0.
[3] HIMILAN 1605 available from Du Pont-Mitsui Polychemicals Company, Ltd. which contains methacrylic acid in an amount of about 15% by weight. The neutralizing ion is sodium and neutralizing amount is about 30 mol %. It has a melt index of 2.8.
[4] HIMILAN 1707 available from Du Pont-Mitsui Polychemicals Company, Ltd. which contains methacrylic acid in an amount of about 15% by weight. The neutralizing ion is sodium and neutralizing amount is about 60 mol %. It has a melt index of 0.9.
[5] HIMILAN 1706 available from Du Pont-Mitsui Polychemicals Company, Ltd. which contains methacrylic acid in an amount of about 15% by weight. The neutralizing ion is zinc and neutralizing amount is about 60 mol %. It has a melt index of 0.9.
[6] Ionomer resin (3); The neutralizing ion is magnesium and neutralizing amount is about 45 mol %. It has a melt index of 1.9.
[7] Calculated from an initial velocity of a golf ball, when a cylindrical material of 198.4 g was struck to the ball at a speed of 45 m/s
[8] A golf ball was struck to a board at a speed of 45 m/s at a temperature of 23° C. and number of striking was determined until the ball was cracked. The number is expressed as an index number when the number of Comparative Example 1 is made 100.

The lithium neutralized ionomer resin of the present invention provides higher impact resilience in comparison with a sodium neutralized ionomer resin commercially available, even if it is used solely as in Examples 1 and 2. If the lithium neutralized ionomer resin is combined with the divalent metal neutralized ionomer resin, impact resilience is further improved as shown in Examples 3 to 6.

What is claimed is:

1. A golf ball comprising a core and a cover covering said core, wherein said cover is a lithium neutralized ionomer resin which is a copolymer of 10 to 20% by weight of an alpha, beta-unsaturated carboxylic acid and the rest of ethylene, of which 20 to 70 mol % of carboxyl groups are neutralized with lithium ion, and said ionomer resin has a melt index of 0.8 to 3.0 and a shore D hardness of 60 to 80.

2. The golf ball according to claim 1 wherein said lithium neutralized ionomer resin has carboxyl groups neutralized with lithium ion in an amount of 20 to 50 mol %.

3. The golf ball according to claim 1 wherein said lithium neutralized ionomer resin is prepared by treating a sodium neutralized ionomer resin to remove sodium ion and then mixing lithium ion sources.

4. The golf ball according to claim 3 wherein said lithium ion sources are lithium hydroxide, lithium carbonate and lithium acetate.

5. A golf ball comprising a core and a cover covering said core, wherein said cover is a mixture of the lithium neutralized ionomer resin according to claim 1 with 10 to 90% by weight of a di- or tri- valent metal neutralized ionomer resin which is a copolymer of 10 to 20% by weight of an alpha, beta-unsaturated carboxylic acid and the rest of ethylene, of which 40 to 70 mol % of carboxyl groups are neutralized with divalent metal ion, and the di- or tri- valent metal neutralized ionomer resin has a melt index of 0.5 to 5.0 and a shore D hardness of 60 to 80.

6. The golf ball according to claim 5 wherein said di- or tri- valent metal neutralized ionomer resin has a melt index of 0.7 to 2.0.

7. The golf ball according to claim 5 wherein said di- or tri- valent metal neutralized ionomer resin has carboxyl groups neutralized with di- or tri- valent metal ion in an amount of 40 to 60 mol %.

8. The golf ball according to claim 5 wherein said di- or tri- valent metal neutralized ionomer resin is prepared by treating a sodium neutralized ionomer resin to remove sodium ion and then mixing di- or tri- valent metal ion sources.

9. The golf ball according to claim 5 wherein said di- or tri- valent metal ion sources are zinc carbonate, zinc acetate, magnesium carbonate and magnesium acetate.

* * * * *